United States Patent [19]
Ische et al.

[11] 3,974,177
[45] Aug. 10, 1976

[54] PROCESS FOR THE PURIFICATION OF CRUDE POLYHALO COPPER PHTHALOCYANINES

[75] Inventors: Friedrich Ische, Naurod, Taunus; Ernst Spietschka, Oberauroff, Taunus, both of Germany

[73] Assignee: Hoechst Aktiengesellschaft, Frankfurt am Main, Germany

[22] Filed: Aug. 15, 1975

[21] Appl. No.: 605,061

[30] Foreign Application Priority Data
Aug. 17, 1974 Germany............................ 2439599

[52] U.S. Cl. ............,................................ 260/314.5
[51] Int. Cl.² ......................................... C09B 47/04

[58] Field of Search .................................. 260/314.5

[56] References Cited
OTHER PUBLICATIONS
Pederson, J. Org. Chem., pp. 127–132, (1957), (vol. 22).

Primary Examiner—Harry I. Moatz
Attorney, Agent, or Firm—Curtis, Morris & Safford

[57] ABSTRACT

Polyhalo copper phthalocyanines are purified in concentrated sulfuric acid under addition of peroxo compounds including addition compounds of hydrogen peroxide. The products are useful as pigments having very pure green shades and good fastness properties.

8 Claims, No Drawings

PROCESS FOR THE PURIFICATION OF CRUDE POLYHALO COPPER PHTHALOCYANINES

The present invention relates to a process for the purification of crude polyhalo copper phthalocyanines.

It is known that polyhalo copper phthalocyanine dyes can be prepared either by halogenating copper phthalocyanines or by reacting polyhalo phthalic acids or derivatives thereof, such as anhydrides, esters, imides or nitriles, with ammonia-yielding agents, for example urea, and copper or copper salts in the presence of suitable catalysts, for example ammonium molybdate, titanium dioxide gel, titanium-(IV)-chloride or zirconium-(IV)-chloride.

The halogenation reaction may be carried out, for example in a melt of aluminum chloride and sodium chloride. The manufacturing method, however, involves high costs, owing to the work-up of large amounts of aluminum chloride, which is necessary for ecological reasons. Another possible synthesis method is a halogenation of copper phthalocyanine in chlorosulfonic acid with sulfur chlorides as catalysts. A drawback of that method is that those products, unless treated additionally upon conversion into a pigment form, are able to color plastic material and lacquers in only dull shades. Moreover, the work-up of chlorosulfonic acid, required for ecological reasons, raises corrosion problems due to inevitably resulting hydrochloric acid.

The synthesis using polyhalo phthalic acids or derivatives thereof, copper salts, urea, suitable catalysts and, optionally solvents is an appropriate method since all the reaction components are used up, except the catalyst which, however, is used in only relatively small amounts, and since the solvent can easily be regenerated and recycled to the process, but the crude polyhalo copper-phthalocyanines thus obtained, after being converted into a pigment form, produce an unsatisfactory, bluish green shade and show too weak a tinctorial strength. They have therefore to be purified.

Methods wherein the crude dyestuff is converted into a pigment form using sulfuric acid and an organic liquid, for example a chlorinated aromatic hydrocarbon and an additive, for example nitrosyl-sulfuric acid, nitric acid or sodium nitrite, have already been proposed (German Patent Specifications Nos. 1,469,644; 1,619,332; 1,619,333 and 1,619,358).

Owing to the sensitivity of the polyhalo copper phthalocyanines towards a possible, even sporadic, excess of sodium nitrite, nitric acid or nitrosyl-sulfuric acid, however, those methods require a very closely controlled reaction to provide pure dyes in a good yield.

It has now been found that a very pure polyhalo copper phthalocyanine is obtained by treating a crude polyhalo copper phthalocyanine in concentrated sulfuric acid with peroxo compounds or addition compounds of hydrogen peroxide, advantageously with salts of peroxo disulfuric acid or with perborates.

The crude polyhalo copper phthalocyanine containing from 8 to 16 chlorine or bromine atoms may be obtained in the usual manner by a synthesis from polyhalo phthalic acids containing 2 to 4 chlorine or bromine atoms, or derivatives thereof, such as anhydrides, imides, amides, nitriles, inasfar as the starting products do not contain nitrogen, urea, copper salts and suitable catalysts, such as ammonium molybdate or titanium compounds, or by a halogenation reaction of copper phthalocyanine. The concentration of the sulfuric acid ranges advantageously from 90 to 100%. The presence of organic liquids is not necessary. The amount of sulfuric acid used depends, as to its lower limit, on the mixability of the system and has no theoretical upper limit. It is advantageous to use, per 1 part of crude polyhalo copper phthalocyanine, from 2 to 10, especially from 2 to about 5 parts of sulfuric acid.

When the crude dyestuff is in the form of an aqueous filter cake, oleum is advantageously used in such a concentration of sulfur trioxide that together with the water contained in the filter cake the desired sulfuric acid concentration is obtained. The amount of peroxo compound used advantageously ranges from 0.05 to about 1 mol, especially from about 0.1 to about 0.5 mol, per mol of polyhalo copper phthalocyanine. The treatment takes place at room temperature or at an elevated temperature, advantageously of from 20° to about 120°C, especially from 20° to 95°C. There is no time limit to the treatment but, generally, 1 to 2 hours with stirring will be sufficient. After the purification step, the mixture may be cooled to room temperature and then carefully diluted with water or dilute sulfuric acid to reach a sulfuric acid concentration as high as to precipitate the sulfate of the polyhalo copper phthalocyanine, i.e. a concentration of from 80 to 90%. The sulfate is isolated by filtration and hydrolized by diluting it with water. In this manner, the polyhalo copper phthalocyanine precipitates with an excellent purity in the form of uniform green crystals suitable for immediate pigment formation. An advantage of the present invention is that this pigment formation does not require the use of a definite diluent nor any definite fine division method but that optimum conditions can be chosen for each product. The product may be made into a pigment, for example by grinding or kneading it in water with or without the addition of an organic compound.

Another advantage of this process is that the sulfuric acid used can be immediately recycled to regeneration that is necessary for ecological reasons, since the concentration of the sulfuric acid upon filtration and purification ranges from 80 to 90% and is thus high enough. This cuts the costs of regeneration considerably, since there is no dilute sulfuric acid that needs concentrating.

When converted into a pigment form, the pure polyhalo copper phthalocyanines prepared according to the process of the invention are suitable for coloring lacquers, plastic material and printing pastes in pure green shades having good fastness properties.

The following Examples illustrate the invention, the parts and percentages being by weight unless stated otherwise.

EXAMPLE 1

100 Parts of crude, dried hexadecachloro copper phthalocyanine prepared by synthesis from tetrachloro phthalic acid anhydride, urea and copper-(II)-sulfate in the presence of ammonium molybdate as a catalyst and trichlorobenzene as a solvent were dissolved at 95°C in 300 parts of 100% sulfuric acid. 6 Parts of sodium perborate ($NaBO_2 \cdot H_2O_2 \cdot 3 H_2O$) were added, and the mixture was stirred for 2 hours at 95°C. It was then cooled to room temperature and carefully diluted with 33 parts of water. The precipitated sulfate was suction-filtered, washed with 30 parts of 90% sulfuric acid and introduced into 1000 parts of water. The pure hexadecachloro copper phthalocyanine obtained in uniform green crystals was suction-filtered with a yield of 89 parts (dry). By grinding it in water while adding a lower aliphatic alcohol, for example isobutanol, the dyestuff can be made into a pigment suitable for coloring lacquers, plastic material and printing pastes in a clear, yellowish green shade.

EXAMPLE 2

100 Parts of a polychloro copper phthalocyanine having a chlorine content of about 49% and prepared by chlorination of copper phthalocyanine in chlorosulfonic acid with addition of sulfur monochloride and iodine chloride as catalysts were dissolved in 400 parts of 96% sulfuric acid. 2 Parts of ammonium peroxodisulfate were added, and the mixture was carefully heated to 50°C. At this temperature, stirring was continued for 1 hour, then the mixture was cooled to room temperature. An addition of 100 parts of 40% sulfuric acid precipitated the sulfate. The brown sulfate crystals were suction-filtered, washed with 50 parts of 90% sulfuric acid and hydrolized in 1000 parts of water. The precipitated polychloro copper phthalocyanine was isolated by filtration and dried. When ground in an organic solvent, for example acetone, the product colored lacquers, plastic material or printing pastes in clear green shades of good color intensity. The yield was 86% of the crude dyestuff used.

EXAMPLE 3

150 Parts of a 66% filter cake containing 99 parts of the crude hexadecachloro copper phthalocyanine as described in Example 1 were introduced carefully while cooling into 500 parts of 40% oleum and stirred for 1 hour at room temperature. Then 2 parts of sodium peroxo-disulfate were added and stirring was continued for 4 hours at room temperature. The mixture was carefully diluted with 50 parts of water, the precipitated sulfate was suction-filtered and washed with 50 parts of 90% sulfuric acid. After hydrolysis in 1000 parts of water, isolation by filtration, washing with water, drying and grinding in water with the addition of an organic medium, for example isopropanol, the dyestuff colored lacquers, plastic material and printing pastes in a pure yellowish green shade. The yield was 87 parts. The sulfuric acid obtained upon filtration could be regenerated without prior concentration.

EXAMPLE 4

100 Parts of crude octachloro copper phthalocyanine prepared by synthesis from 3,6-dichloro phthalimide with urea, a mixture of copper(II)nitrate and copper powder in nitrobenzene in the presence of hydrated titanium dioxide gel were dissolved in 500 parts of 96% sulfuric acid. 7 Parts of sodium perborate were added to this solution which was stirred for 3 hours at room temperature and then carefully diluted with 55 parts of water. Stirring was continued for 2 hours at room temperature, and the product was suction-filtered. The filter cake was introduced into 1000 parts of water, and the precipitated pure octachloro copper phthalocyanine was isolated by filtration. When ground in acetone, it colored lacquers, plastic material and printing pastes in a clear greenish blue shade. The yield was 91 parts.

EXAMPLE 5

A mixture of 85 parts of crude hexadecachloro copper phthalocyanine obtained according to Example 1, and 15 parts of crude hexadecabromo copper phthalocyanine obtained from tetrabromo phthalic acid anhydride according to Example 1 was dissolved in 300 parts of 100% sulfuric acid. 7 Parts of sodium perborate were added to this solution, and the mixture was heated to 90°C for 2 hours. After cooling to room temperature, it was carefully diluted with 33 parts of water, and the precipitated sulfate was suction-filtered. The filter cake was washed with 30 parts of 90% sulfuric acid and, after suction-filtration to dryness, introduced into 300 parts of water. The dyestuff which had been isolated by filtration, washing and drying was ground in the presence of water and cyclohexanol to yield a pigment which colored lacquers, plastic material or printing pastes in a clear yellowish green shade. The yield was 89 parts.

We claim:

1. A process for purifying a polyhalo copper phthalocyanine which comprises treating a crude polyhalocopper phthalocyanine with sulfuric acid of a strength to yield a sulfuric acid concentration at the beginning of the process of 90 to 100% by weight in an amount to provide for mixability of the reaction system and 0.05 to 1 mol per mol of polyhalo copper phthalocyanine of an inorganic peroxo compound or an inorganic peroxo addition compound at a temperature of 20° to 120°C, if necessary, diluting with water or dilute sulfuric acid to reach a sulfuric acid concentration of from 80 to 90% by weight to precipitate the sulfate of the polyhalo copper phthalocyanine, isolating said sulfate and hydrolizing it to yield the pure polyhalo copper phthalocyanine.

2. A process as claimed in claim 1, wherein the polyhalo copper phthalocyanine contains 8 to 16 chlorine and/or bromine atoms.

3. A process as claimed in claim 1, wherein the peroxo compound is a peroxo sulfuric acid or a salt thereof.

4. A process as claimed in claim 1, wherein the peroxo compound is an addition product of hydrogen peroxide and a boric acid or a salt thereof.

5. A process as claimed in claim 1, wherein the temperature is 20° to 95°C.

6. A process as claimed in claim 1, wherein per each part by weight of crude polyhalo coppper phthalocyanine 2 to 10 parts per weight of sulfuric acid are added.

7. A process as claimed in claim 6, wherein the ratio is 1:2–5.

8. A process as claimed in claim 1, wherein the ratio of crude polyhalo copper phthalocyanine to peroxo compound is 1:01.1–0.5.

* * * * *